US009071943B2

(12) United States Patent
Mo

(10) Patent No.: US 9,071,943 B2
(45) Date of Patent: Jun. 30, 2015

(54) METHOD, SERVER, AND SYSTEM FOR PROCESSING EMERGENCY CALL IN POC SERVICE

(71) Applicant: Huawei Technologies Co., Ltd., Shenzhen (CN)

(72) Inventor: Lan Mo, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 13/711,275

(22) Filed: Dec. 11, 2012

(65) Prior Publication Data

US 2013/0102351 A1   Apr. 25, 2013

Related U.S. Application Data

(63) Continuation of application No. PCT/CN2011/075033, filed on May 31, 2011.

(30) Foreign Application Priority Data

Sep. 17, 2010   (CN) .......................... 2010 1 0286928

(51) Int. Cl.
| | |
|---|---|
| *H04W 4/10* | (2009.01) |
| *H04W 4/22* | (2009.01) |
| *H04L 29/06* | (2006.01) |
| *H04W 76/00* | (2009.01) |

(52) U.S. Cl.
CPC ........ *H04W 4/10* (2013.01); *H04W 4/22* (2013.01); *H04W 76/005* (2013.01); *H04W 76/007* (2013.01); *H04L 65/4061* (2013.01)

(58) Field of Classification Search
CPC .............................. H04W 76/007; H04W 4/10

USPC ................ 455/518, 517, 519, 520, 521, 509, 455/452.1

See application file for complete search history.

(56) References Cited

U.S. PATENT DOCUMENTS

| | | | |
|---|---|---|---|
| 7,460,838 | B2 | 12/2008 | Hasegawa |
| 2005/0164727 | A1 | 7/2005 | Hasegawa |

(Continued)

FOREIGN PATENT DOCUMENTS

| | | |
|---|---|---|
| CN | 1913668 A | 2/2007 |
| CN | 101640849 A | 2/2010 |

(Continued)

OTHER PUBLICATIONS

International Search Report issued in corresponding PCT Patent Application No. PCT/CN2011/075033, mailed Sep. 8, 2011.

(Continued)

*Primary Examiner* — John J Lee
(74) *Attorney, Agent, or Firm* — Brinks Gilson & Lione

(57) ABSTRACT

The present disclosure provides a method, a server and a system for processing an emergency call in a PoC service. The method includes: receiving, by a PoC server, an emergency call request sent by an initiator; adding, by the PoC server, a mobile terminal as one party to an established emergency call group according to the emergency call request, where a first party of the emergency call group is a dispatcher; and forwarding, by the PoC server, a two-way session between the mobile terminal and the dispatcher. In the embodiments of the present disclosure, an emergency call may be provided in a PoC service.

17 Claims, 7 Drawing Sheets

(56) References Cited

U.S. PATENT DOCUMENTS

| | | | |
|---|---|---|---|
| 2006/0072517 A1 | 4/2006 | Barrow et al. | |
| 2006/0111134 A1* | 5/2006 | Mills | 455/518 |
| 2006/0120516 A1 | 6/2006 | Armbruster et al. | |
| 2006/0126656 A1 | 6/2006 | Ayyar et al. | |
| 2006/0205428 A1* | 9/2006 | Wajda et al. | 455/518 |
| 2006/0281481 A1 | 12/2006 | Hayashi et al. | |
| 2007/0202910 A1* | 8/2007 | Brewer et al. | 455/521 |
| 2007/0224976 A1 | 9/2007 | Miyata | |
| 2007/0281723 A1 | 12/2007 | Chotai et al. | |
| 2008/0037448 A1 | 2/2008 | Kelley et al. | |
| 2008/0247373 A1 | 10/2008 | Synnergren et al. | |
| 2009/0131092 A1 | 5/2009 | Kaida | |
| 2009/0137263 A1 | 5/2009 | Abbate et al. | |
| 2009/0265472 A1 | 10/2009 | Ayyar et al. | |
| 2011/0161399 A1* | 6/2011 | Agulnik et al. | 709/203 |

FOREIGN PATENT DOCUMENTS

| | | |
|---|---|---|
| CN | 101675674 A | 3/2010 |
| EP | 1564929 A1 | 8/2005 |
| EP | 1638249 A1 | 3/2006 |
| KR | 20060128657 A | 12/2006 |
| WO | WO 2005084059 A1 | 9/2005 |
| WO | WO 2006056852 A2 | 6/2006 |
| WO | WO 2008/063036 A1 | 5/2008 |
| WO | WO 2009073332 A1 | 6/2009 |

OTHER PUBLICATIONS

Open Mobile Alliance, "Push to Talk Over Cellular 2.1 Requirements" Candidate Version 2.1, OMA-RD-PoC-V2_1-20091222-C, Dec. 22, 2009.

Office Action issued in corresponding Chinese Patent Application No. 201010286928.2, mailed Mar. 12, 2013.

Written Opinion of the International Searching Authority issued in corresponding PCT Patent Application No. PCT/CN2011/075033, mailed Sep. 8, 2011.

Rajeev Ranjan, "OMA-POC-POCv2-2006-0328-SD—5.xx-Crisis Event" Change Request Mar. 27, 2006.

* cited by examiner

METHOD, SERVER, AND SYSTEM FOR PROCESSING EMERGENCY CALL IN PoC SERVICE

CROSS-REFERENCE TO RELATED APPLICATIONS

This application is a continuation of International Application No. PCT/CN2011/075033, filed on May 31, 2011, which claims priority to Chinese Patent Application No. 201010286928.2, filed on Sep. 17, 2010, both of which are hereby incorporated by reference in their entireties.

FIELD

The present disclosure relates to mobile communications technologies, and in particular, to a method, a server, and a system for processing an emergency call in a PoC service.

BACKGROUND

Push-to-talk (Push-To-Talk, PTT) is a mobile voice service for implementing a walkie-talkie (Walkie-talkie) function, and has characteristics that call setup time is short, a channel is occupied only during talking, the channel is monitored only during answering, and a receiving party can answer downlink call information at any time without off-hook. A push to talk over cellular (Push to talk over Cellular, PoC) service is a push-to-talk service based on a packet switch (Packet Switch, PS) domain. Through the PoC service, a user only needs to press one key to conveniently make a personal or group conversation. Compared with a conventional private network cluster communication, with the PoC service, problems of coverage, roaming and inter-communication are solved to a large extent, and therefore, a user group is much greater than a cluster system. Moreover, because an end-to-end voice over Internet protocol (Voice over Internet Protocol, VoIP) technology is adopted, a utilization rate of a network resource can be improved more significantly.

The prior art has at least the following problems: In an existing PoC service, a function related to a dispatcher is not defined and involved, and moreover, a solution to an "emergency call" is not provided.

SUMMARY

Embodiments of the present disclosure provide a method, a server and a system for processing an emergency call in a PoC service, so as to implement the emergency call in the PoC service.

An embodiment of the present disclosure provides a method for processing an emergency call in a PoC service, wherein the method includes: receiving, by a PoC server, an emergency call request sent by an initiator; adding, by the PoC server, a mobile terminal as one party to an established emergency call group according to the emergency call request, where a first party of the emergency call group is a dispatcher; and forwarding, by the PoC server, a two-way session between the mobile terminal and the dispatcher.

An embodiment of the present disclosure provides a PoC server, including: a receiving module, configured to receive an emergency call request sent by an initiator; an adding module, configured to add a mobile terminal as one party to an established emergency call group according to the emergency call request, where a first party of the emergency call group is a dispatcher; and a forwarding module, configured to forward a two-way session between the mobile terminal and the dispatcher.

An embodiment of the present disclosure provides a system for processing an emergency call in a PoC service, wherein the system includes: a dispatcher, configured to send a request for establishing an emergency call group to a PoC server, and as a first party of an emergency call group, perform an emergency call with a mobile terminal; and the PoC server, configured to establish an emergency call group according to the request for establishing an emergency call group, add the mobile terminal as one party to an established emergency call group after receiving an emergency call request sent by an initiator, where the first party of the emergency call group is the dispatcher.

It can be known from the foregoing solutions that, in the embodiments of the present disclosure, an emergency call group is established, and a dispatcher is set as a first party of the emergency call group. When an emergency call is initiated, a mobile terminal may be added to the emergency call group. The emergency call is implemented by forwarding a two-way session between the mobile terminal and the dispatcher.

BRIEF DESCRIPTION OF THE DRAWINGS

To describe the solutions in the embodiments of the present disclosure more clearly, the accompanying drawings required for describing the embodiments are introduced briefly in the following. Apparently, the accompanying drawings in the following description are only some embodiments of the present disclosure, and persons of ordinary skill in the art may still derive other drawings from these accompanying drawings without creative efforts.

DETAILED DESCRIPTION OF THE EMBODIMENTS

In order to make the objectives, solutions, and advantages of the embodiments of the present disclosure clearer, the solutions in the embodiments of the present disclosure are clearly and completely described in the following with reference to the accompanying drawings in the embodiments of the present disclosure. Apparently, the embodiments to be described are only part rather than all of the embodiments of the present disclosure. Based on the embodiments of the present disclosure, all other embodiments obtained by persons of ordinary skill in the art without creative efforts shall fall within the protection scope of the present disclosure.

Figure 1:
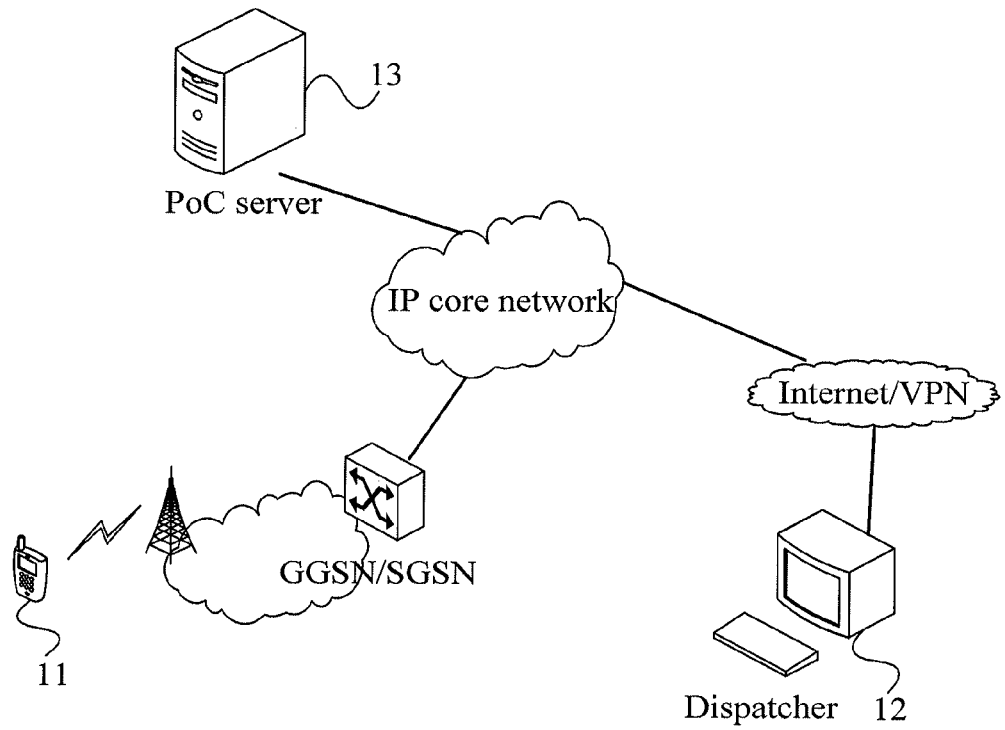
FIG. 1 is a schematic structural diagram of a system on which a first embodiment of the present disclosure is based.

FIG. 1 is a schematic structural diagram of a system on which a first embodiment of the present disclosure is based. The system includes a mobile terminal 11, a dispatcher 12, and a PoC server 13. The mobile terminal 11 accesses an IP core network through a radio access network (Radio Access Network, RAN), a serving general packet radio service (General packet radio service, GPRS) support node (Serving GPRS Support Node, SGSN) or a gateway GPRS support node (Gateway GPRS Support Node, GGSN), and accesses the PoC server 13 through the IP core network. The dispatcher 12 accesses the IP core network through the Internet or a virtual private network (Virtual Private Network, VPN), and accesses the PoC server 13 through the IP core network.

PoC client software needs to be installed in a mobile terminal, and a user logs on to a PoC server after power-on. In a general case, after logging on to the PoC server, the mobile terminal automatically or manually joins a designated group session, and then can listen in to conversation content of a current group session. The mobile terminal may also apply for speaking by pressing a "PTT" button, and can speak after hearing a prompt tone. At another group member side, current speaking content can be listened in to. Such a communication process is a packet half-duplex conversation process based on a radio packet domain.

A process of implementing an emergency call may be divided into three stages. A first stage is that a dispatcher joins an emergency call group; a second stage is an emergency call conversation process; and a third stage is that an emergency call process is ended. The second stage may be divided into a procedure that a mobile terminal initiates an emergency call and a procedure that the dispatcher initiates an emergency call.

Figure 2:
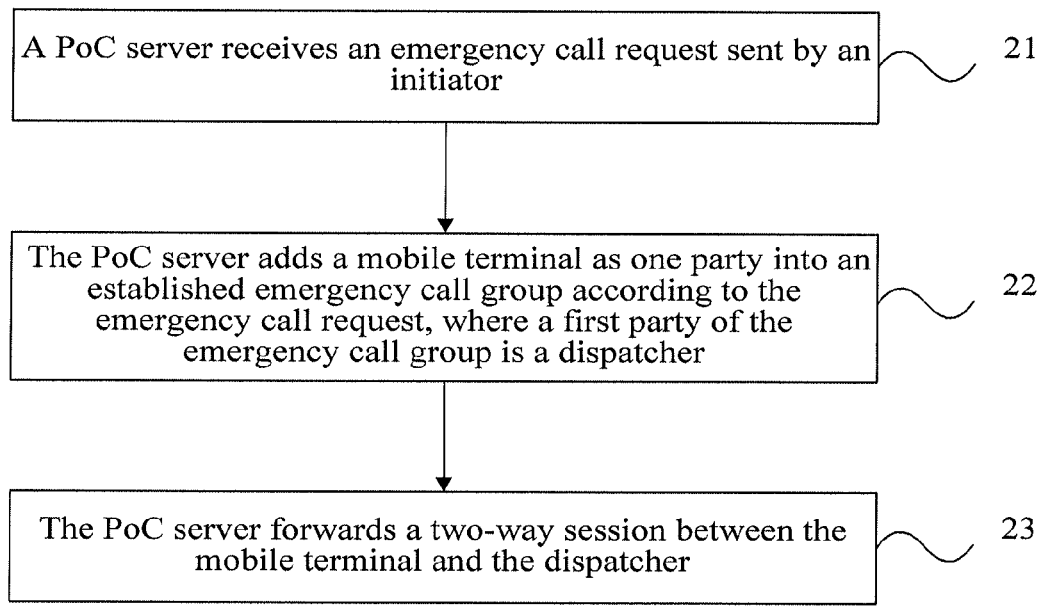
FIG. 2 is a schematic flow chart of a method according to a second embodiment of the present disclosure.

FIG. 2 is a schematic flow chart of a method according to a second embodiment of the present disclosure, where the method includes:

Step 21: A PoC server receives an emergency call request sent by an initiator.

According to different scenarios, the initiator may be a mobile terminal, and may also be a dispatcher.

Step 22: The PoC server adds a mobile terminal as one party to an established emergency call group according to the emergency call request, where a first party of the emergency call group is a dispatcher.

In this embodiment of the present disclosure, each emergency call group corresponds to one dispatcher. After the dispatcher initiates establishment of an emergency call group and the PoC server establishes the emergency call group, the mobile terminal may be added to the emergency call group.

Step 23: The PoC server forwards a two-way session between the mobile terminal and the dispatcher.

Through forwarding of the PoC server, an emergency call may be implemented between the mobile terminal and the dispatcher.

In this embodiment, the emergency call group is established, and the dispatcher is set as the first party of the emergency call group. When an emergency call is initiated, the mobile terminal may be added to the emergency call group. The emergency call is implemented by forwarding the two-way session between the mobile terminal and the dispatcher.

Figure 3:
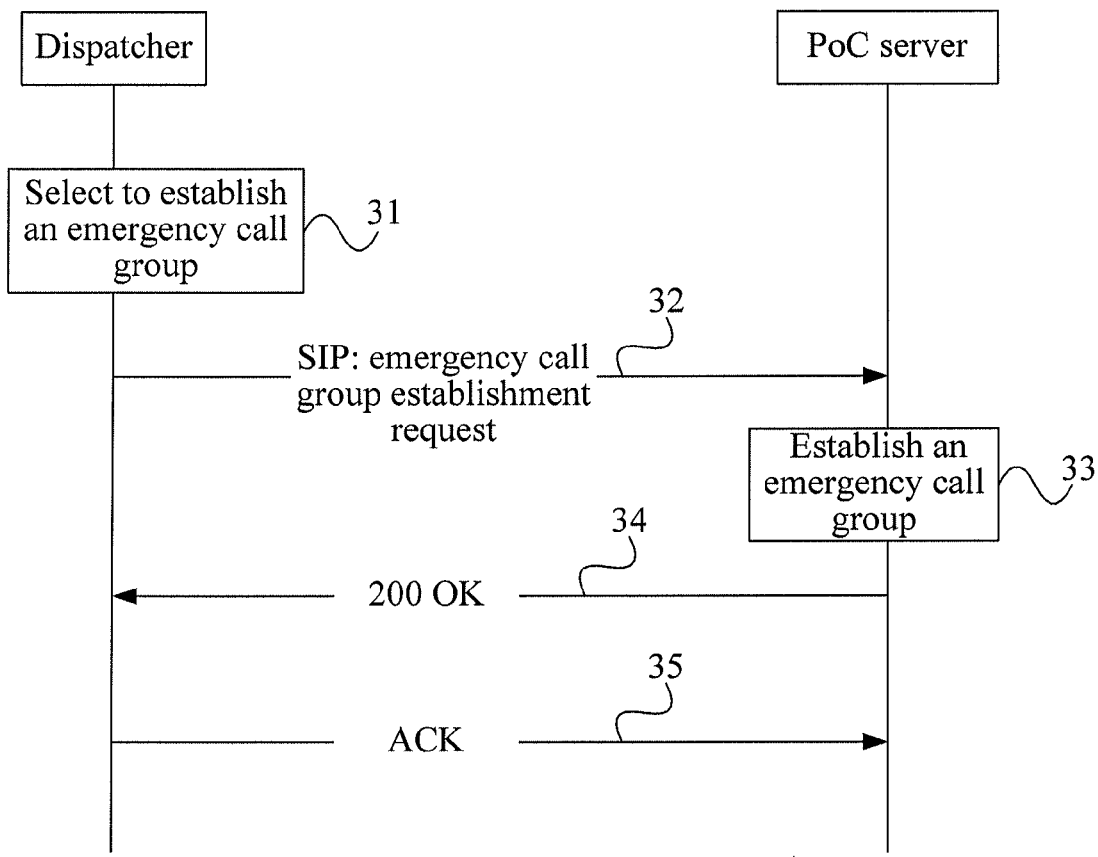
FIG. 3 is a schematic diagram of a procedure that a dispatcher joins an emergency call group according to a third embodiment of the present disclosure.

FIG. 3 is a schematic diagram of a procedure that a dispatcher joins an emergency call group according to a third embodiment of the present disclosure, where the procedure includes:

Step 31: After logging on to a PoC server, a dispatcher selects to establish an emergency call group.

For example, an "Establish an Emergency Channel" option is set at a dispatcher side, and the dispatcher establishes an emergency call group by selecting the "Establish an Emergency Channel" option.

Step 32: The dispatcher sends a request for establishing an emergency call group (SIP INVITE) to the PoC server, where a special group ID is carried, and the special group ID is an emergency call group ID.

Step 33: After receiving the INVITE message, the PoC server establishes the emergency call group.

Specifically, the INVITE request may carry a dispatcher identifier. The PoC server determines, according to the dispatcher identifier, that the request is a request related to an emergency call, obtains user information by looking up a table, and determines that the user belongs to a dispatcher type. Therefore, it may be determined that the request is a request for establishing an emergency call group. The PoC server establishes an emergency call group, and adds the dispatcher as a first party to the emergency call group.

The dispatcher serves as the first party of the emergency call group. When the dispatcher does not join the emergency call group, it does not support that a mobile terminal initiates an emergency call and joins an emergency call group. After joining the emergency call group, the dispatcher becomes a resident member of the emergency call group, and may select a mobile terminal in a call queue by pressing a key for conversation. One system may be configured with multiple dispatchers, each dispatcher corresponds to one emergency call group, and each emergency call group may correspond to multiple mobile terminals. The PoC server may allocate a dispatcher for a mobile terminal according to an online/offline or idle/busy state of each dispatcher.

Step 34: The PoC server constructs a success response (200 OK) and returns the success response to the dispatcher.

Step 35: After the dispatcher receives the success response, a success in establishment of an emergency call channel group is displayed on an interface, a queuing state of emergency call channels may be displayed, and an acknowledgement message (ACK) is returned to the PoC server.

In this embodiment, the dispatcher joins the emergency call group, which may provide a foundation for communication between the mobile terminal and the dispatcher after initiation of a subsequent emergency call.

Figure 4:
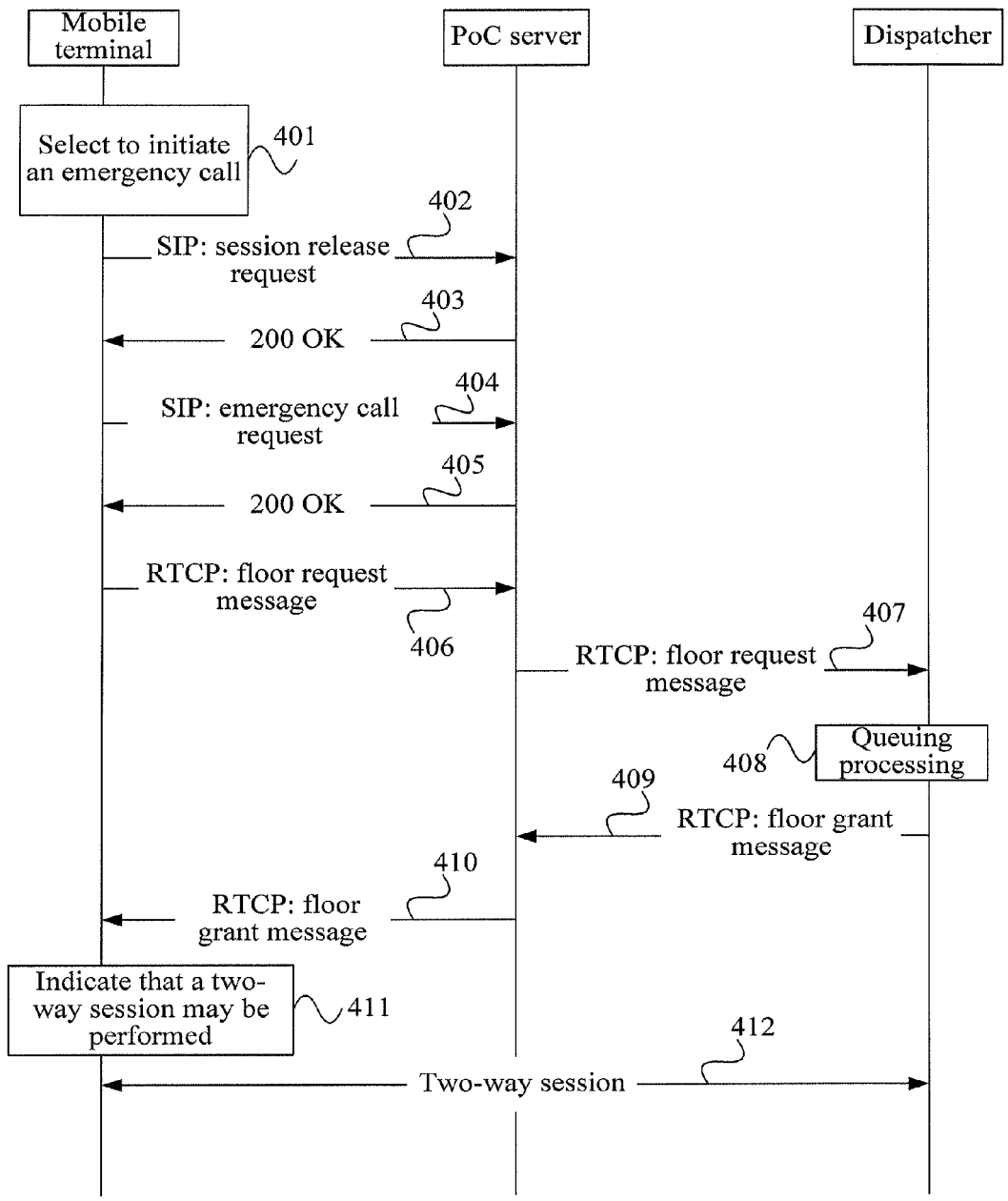
FIG. 4 is a schematic diagram of a procedure that a mobile terminal initiates an emergency call according to a fourth embodiment of the present disclosure.

FIG. 4 is a schematic diagram of a procedure that a mobile terminal initiates an emergency call according to a fourth embodiment of the present disclosure, where the procedure includes:

Step 401: A mobile terminal selects to initiate an emergency call.

For example, an "Emergency Call" option is set on the mobile terminal, and a user initiates an emergency call by pressing the "Emergency Call" option.

If the mobile terminal currently participates in a group session, the following steps are included.

Step 402: The mobile terminal sends a session release request (SIP BYE) to a PoC server.

Step 403: After receiving the session release request, the PoC server releases the group session in which the mobile terminal currently participates, and returns a success response (200 OK) to the mobile terminal.

After the group session in which the mobile terminal currently participates is released, or when the mobile terminal does not participate in any group session currently, the following steps are included.

Step 404: The mobile terminal sends an emergency call request (SIP INVITE) to the PoC server, where an emergency call channel group ID is carried.

Step 405: The PoC server selects an emergency call group for the mobile terminal, and returns a success response (200 OK) to the mobile terminal.

First, user group information and authority information are obtained. Through a user identifier carried in the INVITE message, it may be known that the user group information is a mobile terminal type, and through the emergency call channel group ID carried in the INVITE message, it may be known that the authority information is a request for joining an emergency call group.

Then, the PoC server determines whether an emergency call group corresponding to the emergency call channel group ID is established, and if the emergency call group is not established, refuses the INVITE request. If the emergency call group is already established, the PoC server selects, according to online and busy states of the dispatcher, an emergency call group for the mobile terminal to join. The PoC server adds the mobile terminal as another party to a selected emergency call group.

Step 406: After receiving the success response, the mobile terminal constructs and sends a floor request (Floor request) to the PoC server.

At this time, the mobile terminal may display "it is queuing; please wait for a response of the dispatcher".

Step 407: If the PoC server finds that the floor request is a floor request of a mobile phone client of an emergency group, the PoC server directly forwards the floor request to the dispatcher for queuing processing.

Step 408: After receiving the floor request forwarded by the PoC server, the dispatcher automatically performs queuing processing, and displays "the xxx-th user is waiting for an emergency call response" on a display interface.

Step 409: The dispatcher processes an emergency call in each queue successively, and selects "Accept" or "Refuse"; if "Refuse" is selected, executes a processing procedure of exiting the emergency call; and if "Accept" is selected, returns a floor grant message (Floor Grant) to the PoC server.

Step 410: The PoC server forwards the floor grant message to the mobile terminal.

Step 411: After receiving a floor grant response, the mobile terminal indicates that the user may perform a two-way conversation with the dispatcher.

Step 412: Through forwarding of the PoC server, the dispatcher and the mobile terminal may perform a two-way conversation (two-way session). The dispatcher can hear speaking of the user, and the mobile terminal initiating the emergency call can also hear speaking of the dispatcher.

In this embodiment, through the foregoing procedure, processing after the mobile terminal initiates the emergency call may be provided, thereby implementing a two-way communication between the mobile terminal and the dispatcher, and implementing emergency call processing when the mobile terminal initiates the emergency call.

Figure 5:
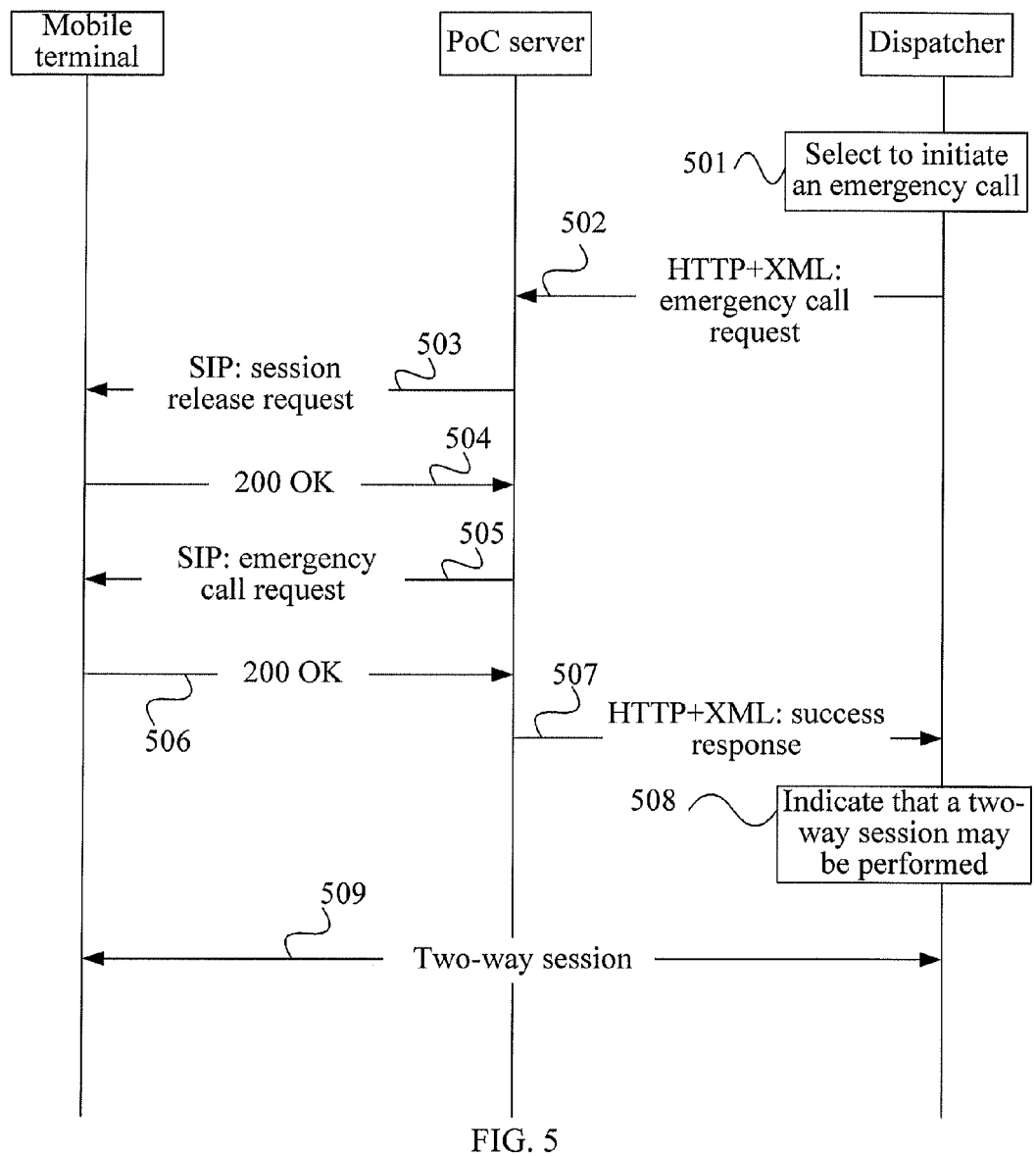
FIG. 5 is a schematic diagram of a procedure that a dispatcher initiates an emergency call according to a fifth embodiment of the present disclosure.

FIG. 5 is a schematic diagram of a procedure that a dispatcher initiates an emergency call according to a fifth embodiment of the present disclosure, where the procedure includes:

Step 501: A dispatcher selects to initiate an emergency call.

For example, the dispatcher selects a certain mobile terminal from a mobile terminal list, and selects an emergency call through an "Emergency Call Member" option at a dispatcher side.

Step 502: The dispatcher sends an emergency call request (HTTP+XML) to a PoC server.

For example, the dispatcher constructs an HTTP+XML request, where the request carries a mobile terminal ID; and then sends the request to the PoC server.

Step 503: When the mobile terminal selected by the dispatcher is participating in another group session, the PoC server sends a session release request (BYE message) to the mobile terminal.

For example, after receiving the HTTP+XML request, the PoC sever determines a state of a mobile terminal that corresponds to the mobile terminal ID. When the mobile terminal is off line, the PoC server feeds back a failure response to the dispatcher; and when the mobile terminal participates in another group session, the PoC server constructs SIP signaling that is a BYE message and sends the SIP signaling to the mobile terminal.

Step 504: After receiving the session release request, the mobile terminal releases the group session in which the mobile terminal is participating, and then returns a success response (200 OK) to the PoC server.

Step 505: When the mobile terminal does not participate in another group session currently, or after the mobile terminal releases another group session in which the mobile terminal participates currently, the PoC server sends an emergency call request (SIP INVITE) to the mobile terminal.

For example, after PoC server determines, through the mobile terminal ID in the HTTP+XML message, that the mobile terminal does not participate in another group session currently, or after the PoC sever receives a success response that corresponds to the session release request, the PoC server constructs SIP signaling that is an emergency call request, where an emergency call group ID is carried; and then sends the emergency call request to the mobile terminal.

Step 506: After receiving the emergency call group request, the mobile terminal determines that the emergency call group ID is carried in the emergency call group request, and then returns a success response (200 OK) to the PoC server. Meanwhile, "In an emergency call conversation" may be displayed on an interface of the mobile terminal.

Step 507: After receiving the success response, the PoC server records the emergency call group, allows a two-way conversation between the mobile terminal and the dispatcher, and returns an HTTP+XML success response to the dispatcher.

Step 508: After receiving the HTTP+XML success response, the dispatcher may indicate, through an interface and a prompt tone, that the dispatcher may perform a two-way conversation with the mobile terminal.

Step 509: Through forwarding of the PoC server, the dispatcher and the mobile terminal may perform the two-way conversation. The dispatcher can hear speaking of a user, and the mobile terminal initiating the emergency call can also hear speaking of the dispatcher.

In this embodiment, through the foregoing procedure, processing after the dispatcher initiates an emergency call may be provided, thereby implementing a two-way communication between the mobile terminal and the dispatcher, and implementing emergency call processing when the dispatcher initiates the emergency call.

Figure 6:
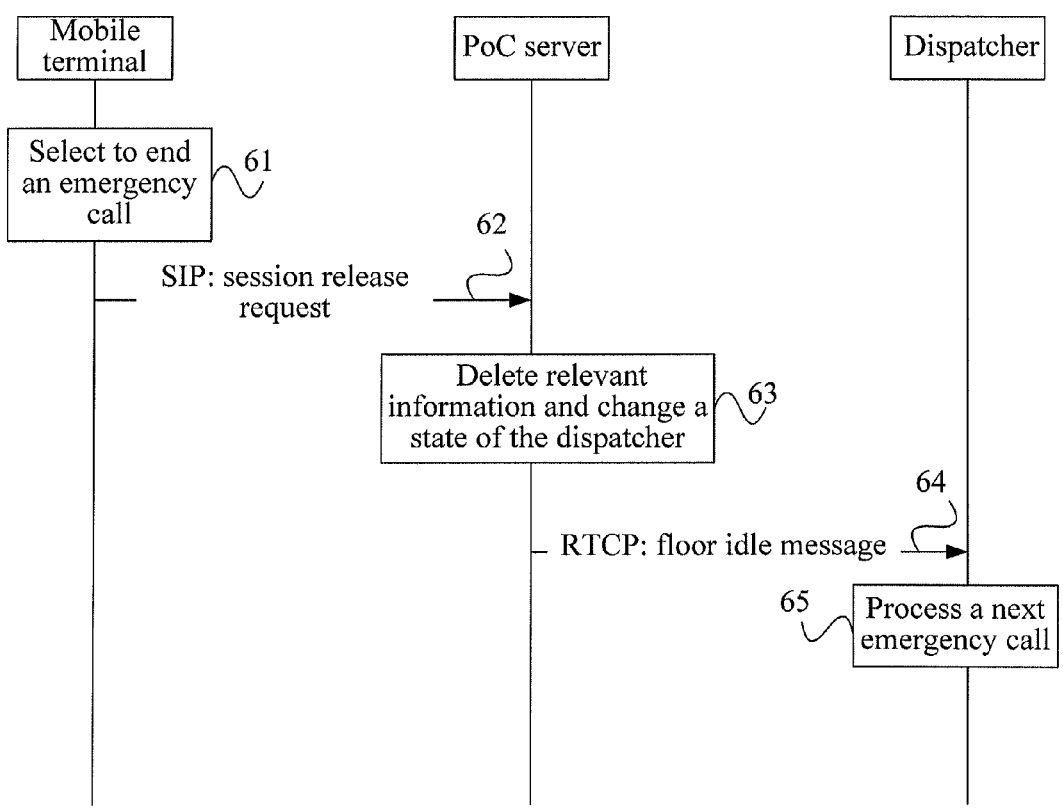
FIG. 6 is a schematic diagram of a procedure that a mobile terminal ends an emergency call according to a sixth embodiment of the present disclosure.

FIG. 6 is a schematic diagram of a procedure that a mobile terminal ends an emergency call according to a sixth embodiment of the present disclosure, where the procedure includes:

Step 61: A mobile terminal selects to end an emergency call.

For example, the mobile terminal selects to end the emergency call by selecting an "Exit" option.

Step 62: The mobile terminal sends a session release request (BYE) to a PoC server, where an emergency call group ID is carried.

For example, the mobile terminal constructs SIP signaling that is a BYE message, where the signaling carries an emergency call group ID; and then sends the BYE message to the PoC server.

Step 63: After receiving the BYE message, the PoC server deletes relevant information of the mobile terminal in an emergency call group, and updates a state of a dispatcher corresponding to the mobile terminal to be an idle state (NULL).

Step 64: The PoC server sends a floor idle message to the dispatcher, where the floor idle message is an RTCP Floor idle message.

Step 65: After receiving the floor idle message, the dispatcher starts to process a next emergency call.

In this embodiment, through the foregoing procedure, the emergency call may be ended, and a solution that the mobile terminal ends the emergency call is provided.

Figure 7:
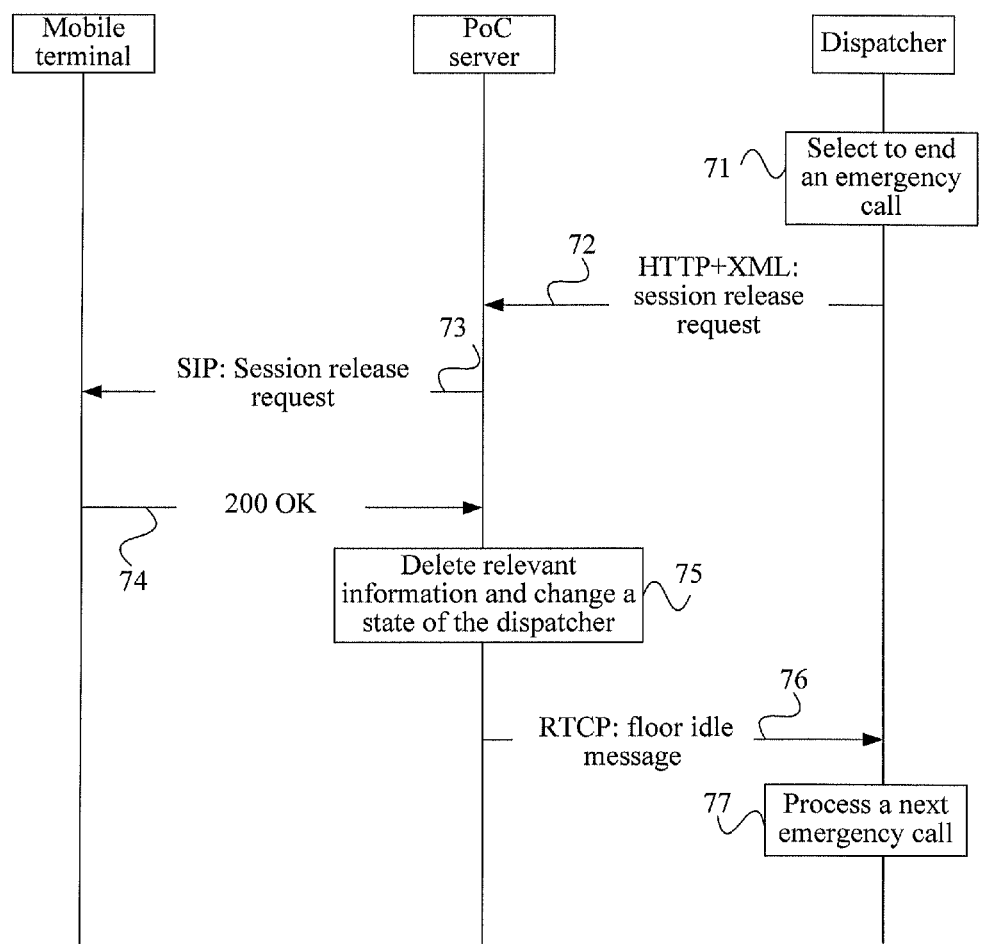
FIG. 7 is a schematic diagram of a procedure that a dispatcher ends an emergency call according to a seventh embodiment of the present disclosure.

FIG. 7 is a schematic diagram of a procedure that a dispatcher ends an emergency call according to a seventh embodiment of the present disclosure, where the procedure includes:

Step 71: A dispatcher selects to end an emergency call.

The dispatcher may select to end the emergency call through an "End" key on an interface.

Step 72: The dispatcher sends a session release request (HTTP+XML) to a PoC server, where an emergency call group ID and a mobile terminal ID are carried.

Step 73: The PoC server sends a session release request (BYE) to a mobile terminal that corresponds to the mobile terminal ID.

Step 74: The mobile terminal releases an emergency call that is currently performed, and returns a success response (200 OK) to the PoC server.

After releasing an emergency call session, the mobile terminal may update an interface to "End the emergency call".

Step 75: After receiving the success response sent by the mobile terminal, the PoC server deletes relevant information of the mobile terminal in an emergency call group, and updates a state of a dispatcher that corresponds to the mobile terminal to be an idle state.

Step 76: The PoC server sends a floor idle message to the dispatcher, where the floor idle message is an RTCP Floor idle message.

Step 77: After receiving the floor idle message, the dispatcher starts to process a next emergency call.

In this embodiment, through the foregoing procedure, the emergency call may be ended, and a solution that the dispatcher ends the emergency call is provided.

Figure 8:
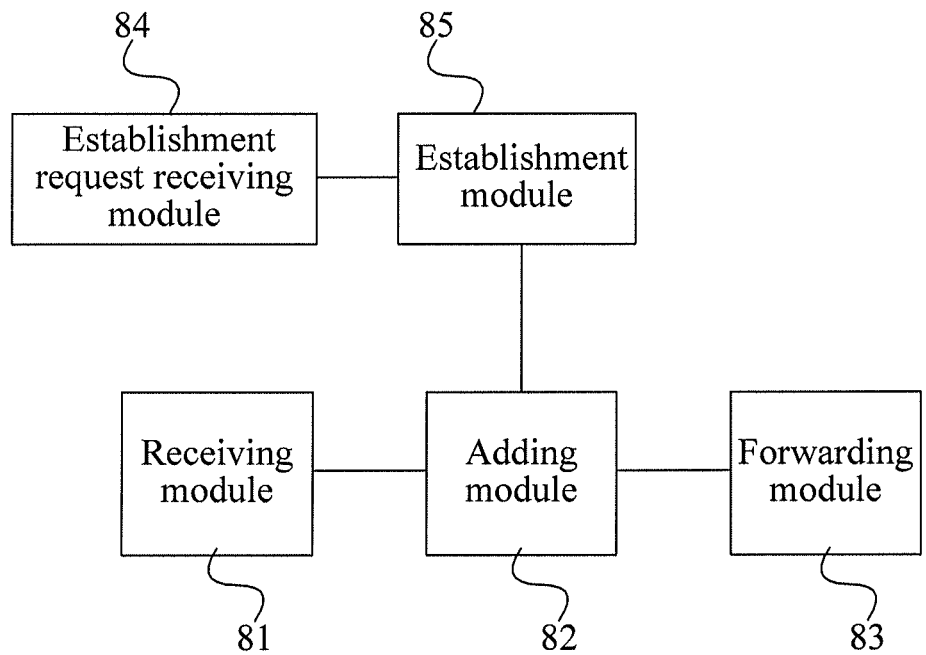
FIG. 8 is a schematic structural diagram of a PoC server according to an eighth embodiment of the present disclosure.

FIG. 8 is a schematic structural diagram of a PoC server according to an eighth embodiment of the present disclosure, where the PoC server includes a receiving module 81, an adding module 82, and a forwarding module 83. The receiving module 81 is configured to receive an emergency call request sent by an initiator; the adding module 82 is configured to add a mobile terminal as one party to an established emergency call group according to the emergency call request, where a first party of the emergency call group is a dispatcher; and the forwarding module 83 is configured to forward a two-way session between the mobile terminal and the dispatcher.

When the initiator is the mobile terminal, the adding module 82 may specifically include a selecting unit, a request unit, and a granting unit. The selecting unit is configured to select one emergency call group for the mobile terminal from established emergency call groups; the request unit is configured to send a floor request to a dispatcher that corresponds to a selected emergency call group, so that the dispatcher performs queuing processing on the floor request; and the granting unit is configured to receive a floor grant response sent by the dispatcher, and forwards the floor grant response to the mobile terminal, so that the mobile terminal initiates a conversation. Further, when the mobile terminal is in a session currently, a release request receiving module and a release module may further be included. The release request receiving module is configured to receive a session release request sent by the mobile terminal; and the release module is configured to release a current session of the mobile terminal.

When the initiator is the dispatcher, the emergency call request carries a mobile terminal ID. At this time, the adding module 82 may include a sending unit and a forwarding unit. The sending unit is configured to send an emergency call request to a mobile terminal that corresponds to the mobile terminal ID; and the forwarding unit is configured to receive a success response returned by the mobile terminal, and forward the success response to the dispatcher, so that the dispatcher initiates a conversation. Further, when the mobile terminal is in a session currently, a release request sending module may further be included. The release request sending module is configured to send a session release request to the mobile terminal, so that the mobile terminal releases a current session.

Further, this embodiment may further include an establishment request receiving module 84 and an establishment module 85. The establishment request receiving module 84 is configured to receive a request for establishing an emergency call group, where the request for establishing an emergency call group is sent by the dispatcher; and the establishment module 85 is configured to establish an emergency call group and use the dispatcher as a first party of the emergency call group.

In addition, when the dispatcher ends an emergency call, a first ending request receiving module, a first deleting module, and a first ending module may further be included. The first ending request receiving module is configured to receive an emergency call ending request sent by the dispatcher, where the emergency call ending request carries a mobile terminal ID; the first deleting module is configured to delete relevant emergency call information of a mobile terminal that corresponds to the mobile terminal ID and change a state of the dispatcher to an idle state; and the first ending module is configured to send a session release request to the mobile terminal, so that the mobile terminal releases the emergency call.

When the mobile terminal ends an emergency call, a second ending request receiving module, a second deleting module, and a second ending module are further included. The second ending request receiving module is configured to receive an emergency call ending request sent by the mobile terminal; the second deleting module is configured to delete relevant emergency call information of the mobile terminal and change a state of a dispatcher that corresponds to the mobile terminal to an idle state; and the second ending module is configured to send a floor idle message to the dispatcher, so that the dispatcher processes a next floor request.

In this embodiment, the emergency call is implemented by forwarding the two-way session between the mobile terminal and the dispatcher.

Figure 9:
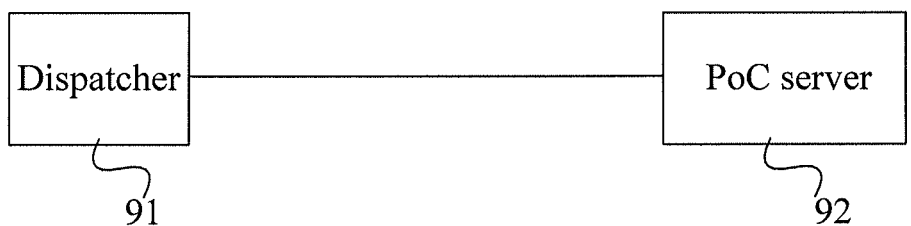
FIG. 9 is a schematic structural diagram of a system according to a ninth embodiment of the present disclosure.

FIG. 9 is a schematic structural diagram of a system according to a ninth embodiment of the present disclosure, where the system includes a dispatcher 91 and a PoC server 92. The dispatcher 91 is configured to send a request for establishing an emergency call group to the PoC server, and as a first party of an emergency call group, perform an emergency call with a mobile terminal; and the PoC server 92 is configured to establish an emergency call group according to the request for establishing an emergency call group, and add the mobile terminal as one party to an established emergency call group after receiving an emergency call request sent by an initiator, where the first party of the emergency call group is the dispatcher.

The PoC server may be specifically shown in FIG. 8. The dispatcher may be specifically shown in FIG. 10.

In this embodiment, an emergency call group is established, and a dispatcher is set as a first party of the emergency call group. Each dispatcher corresponds to one emergency call group, and a mobile terminal may be added to the emergency call group when an emergency call is initiated. The emergency call is implemented by forwarding a two-way session between the mobile terminal and the dispatcher.

Figure 10:
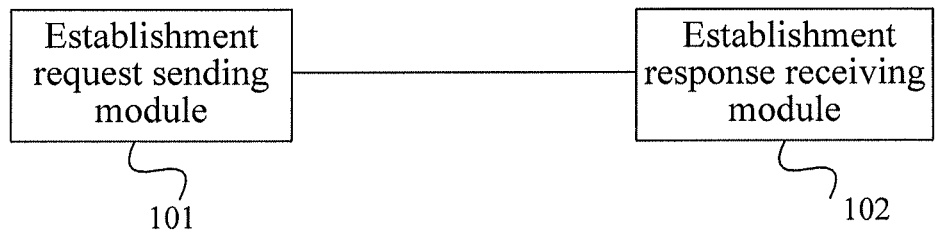
FIG. 10 is a schematic structural diagram of a dispatcher according to a tenth embodiment of the present disclosure.

FIG. 10 is a schematic structural diagram of a dispatcher according to a tenth embodiment of the present disclosure, where the dispatcher includes an establishment request sending module 101 and an establishment response receiving module 102. The establishment request sending module 101 is configured to send a request for establishing an emergency call group to a PoC server, so that the PoC server establishes an emergency call group and uses the dispatcher as a first party of the emergency call group. The establishment response receiving module 102 is configured to receive a success response returned by the PoC server, where the success response is sent after the PoC server establishes the emergency call group according to the request for establishing an emergency call group and uses the dispatcher as the first party of the emergency call group.

The dispatcher in this embodiment may further include a request receiving module, a processing module, and a response sending module. The request receiving module is configured to receive a floor request sent by the PoC server; the processing module is configured to perform queuing processing on the floor request; and the response sending module is configured to send a floor grant response to the PoC server, so that the PoC server forwards the floor grant response to the mobile terminal, and then the mobile terminal initiates a conversation.

An initiation request sending module may further be included and is configured to send an emergency call request to the PoC server, where the emergency call request carries a mobile terminal ID, so that the PoC server sends the emergency call request to a mobile terminal that corresponds to the mobile terminal ID; and a conversation initiation module may further be included and is configured to receive a success response that is returned by the mobile terminal and forwarded by the PoC server, and initiate a conversation.

An ending request sending module may further be included and is configured to send an emergency call ending request to the PoC server, where the emergency call ending request carries a mobile terminal ID, so that the PoC server releases an emergency call of a mobile terminal that corresponds to the mobile terminal ID.

Persons of ordinary skill in the art may understand that all or a part of the steps of the foregoing method embodiments may be implemented by a program instructing relevant hardware such as a PoC server having a hardware processor. The program may be stored in a computer readable storage medium. When the program runs, the steps of the foregoing method embodiments are performed. The storage medium may be any medium that is capable of storing program codes, such as a ROM, a RAM, a magnetic disk, or an optical disk.

Finally, it should be noted that the foregoing embodiments are merely used for describing the solutions of the present disclosure, but are not intended to limit the present disclosure. It should be understood by persons of ordinary skill in the art that although the present disclosure has been described in detail with reference to the foregoing embodiments, modifications may still be made to the solutions described in the foregoing embodiments, or equivalent replacements may be made to some features in the solutions, however these modifications or replacements do not make the essence of corresponding solutions depart from the spirit and scope of the solutions in the embodiments of the present disclosure.

What is claimed is:

1. A method for processing an emergency call in a Push to talk over Cellular (PoC) service, comprising:
   receiving, by a PoC server, a first emergency call request sent by an initiator;
   if the initiator is a mobile terminal:
   adding, by the PoC server, the mobile terminal as one party to an established emergency call group according to the first emergency call request, wherein a first party of the emergency call group is a dispatcher, wherein the adding of the mobile terminal as the one party to the established emergency call group comprising:
      selecting, by the PoC server, one emergency call group for the mobile terminal from multiple established emergency call groups according to busy/idle states of dispatchers that correspond to the multiple emergency call groups; and
   forwarding afterwards, by the PoC server, a two-way session between the mobile terminal and the dispatcher.

2. The method according to claim 1, wherein after the selecting of the one emergency call group for the adding of the mobile terminal being the initiator as the one party to the established emergency call group, the PoC server further performs:
   sending, by the PoC server, a floor request to a dispatcher that corresponds to a selected emergency call group, so that the dispatcher performs queuing processing on the floor request; and
   receiving, by the PoC server, a floor grant response sent by the dispatcher, and forwarding the floor grant response to the mobile terminal, so that the mobile terminal initiates a conversation.

3. The method according to claim 2, wherein before receiving, by the PoC server, the emergency call request sent by the mobile terminal as the initiator, the method further comprises:
   receiving, by the PoC server, a session release request sent by the mobile terminal; and
   releasing, by the PoC server, a current session of the mobile terminal.

4. The method according to claim 1, wherein the mobile terminal has previously been added as the one party to the established emergency call group through a previous initiation of the first emergency call request to the PoC server, wherein if the initiator is the dispatcher:
   initiating by the dispatcher, a second emergency call request which carries a mobile terminal ID of the mobile terminal which had previously been added in the established emergency call group, wherein processing of the second emergency call request by the PoC server, comprises:

sending, by the PoC server, the second emergency call request to the mobile terminal that corresponds to the mobile terminal ID; and receiving, by the PoC server, a success response returned by the mobile terminal, and forwarding the success response to the dispatcher, so that the dispatcher initiates a conversation with the mobile terminal.

5. The method according to claim 4, wherein before sending, by the PoC server, the second emergency call request to the mobile terminal that corresponds to the mobile terminal ID, the method further comprises:

sending, by the PoC server, a session release request to the mobile terminal, so that the mobile terminal releases a current session.

6. The method according to claim 1, further comprising:

receiving, by the PoC server, a request for establishing an emergency call group, wherein the request for establishing the emergency call group is sent by the dispatcher; and establishing, by the PoC serve, the emergency call group, and using the dispatcher as a first party of the emergency call group.

7. The method according to claim 1, further comprising:

receiving, by the PoC server, an emergency call ending request sent by the dispatcher, wherein the emergency call ending request carries a mobile terminal ID;

deleting, by the PoC server, relevant emergency call information of a mobile terminal that corresponds to the mobile terminal ID, and changing a state of the dispatcher to an idle state; and sending, by the PoC server, a session release request to the mobile terminal, so that the mobile terminal releases an emergency call.

8. The method according to claim 1, further comprising:

receiving, by the PoC server, an emergency call ending request sent by the mobile terminal;

deleting, by the PoC server, relevant emergency call information of the mobile terminal, and changing a state of a dispatcher that corresponds to the mobile terminal to an idle state; and sending, by the PoC server, a floor idle message to the dispatcher, so that the dispatcher processes a next floor request.

9. A Push to talk over Cellular (PoC) server, comprising:

a receiving module, configured to receive a first emergency call request sent by an initiator;

an adding module, configured to add a mobile terminal as one party to an established emergency call group according to the first emergency call request, wherein a first party of the emergency call group is a dispatcher;

wherein if the initiator is a mobile terminal, the adding module of the PoC server is configured to select one emergency call group for the mobile terminal from multiple established emergency call groups according to busy/idle states of dispatchers that correspond to the multiple emergency call groups; and a forwarding module, configured to forward afterwards, a two-way session between the mobile terminal and the dispatcher.

10. The server according to claim 9, wherein the initiator is the mobile terminal, and the adding module further comprises:

a request unit, configured to send a floor request to a dispatcher that corresponds to a selected emergency call group, so that the dispatcher performs queuing processing on the floor request; and a granting unit, configured to receive a floor grant response sent by the dispatcher, and forward the floor grant response to the mobile terminal, so that the mobile terminal initiates a conversation.

11. The server according to claim 10, further comprising:

a release request receiving module, configured to receive a session release request sent by the mobile terminal; and a release module, configured to release a current session of the mobile terminal.

12. The server according to claim 9, wherein the mobile terminal has previously been added as the one party to the established emergency call group through a previous initiation of the first emergency call request to the PoC server, and if the initiator is the dispatcher, the dispatcher initiates a second emergency call request which carries a mobile terminal ID of the mobile terminal which had previously been added in the established emergency call group, and the adding module comprises:

a sending unit, configured to send the second emergency call request to the mobile terminal that corresponds to the mobile terminal ID; and a forwarding unit, configured to receive a success response returned by the mobile terminal, and forward the success response to the dispatcher, so that the dispatcher initiates a conversation with the mobile terminal.

13. The server according to claim 12, further comprising:

a release request sending module, configured to send a session release request to the mobile terminal, so that the mobile terminal releases a current session.

14. The server according to claim 9, further comprising:

an establishment request receiving module, configured to receive a request for establishing an emergency call group, wherein the request for establishing the emergency call group is sent by the dispatcher; and an establishment module, configured to establish the emergency call group, and use the dispatcher as a first party of the emergency call group.

15. The server according to claim 9, further comprising:

a first ending request receiving module, configured to receive an emergency call ending request sent by the dispatcher, wherein the emergency call ending request carries a mobile terminal ID;

a first deleting module, configured to delete relevant emergency call information of a mobile terminal that corresponds to the mobile terminal ID, and change a state of the dispatcher to an idle state; and a first ending module, configured to send a session release request to the mobile terminal, so that the mobile terminal releases an emergency call.

16. The server according to claim 9, further comprising:

a second ending request receiving module, configured to receive an emergency call ending request sent by the mobile terminal;

a second deleting module, configured to delete relevant emergency call information of the mobile terminal, and change a state of a dispatcher that corresponds to the mobile terminal to an idle state; and a second ending module, configured to send a floor idle message to the dispatcher, so that the dispatcher processes a next floor request.

17. A system for processing an emergency call in a Push to talk over Cellular (PoC) service, comprising:

a dispatcher, configured to send a request for establishing an emergency call group to a PoC server, and as a first party of an emergency call group, perform an emergency call with a mobile terminal; and the PoC server, configured to:

establish an emergency call group according to the request for establishing an emergency call group, add the mobile terminal as one party to an established emergency call group after receiving an emergency call request sent by an initiator, wherein if the initiator is a mobile terminal, the adding of the mobile terminal as the one party to the established emergency call group comprising the PoC server configured to:

select one emergency call group for the mobile terminal from multiple established emergency call groups according to busy/idle states of dispatchers that correspond to the multiple emergency call groups; and wherein the first party of the emergency call group is the dispatcher.

* * * * *